Patented June 6, 1939

2,160,939

UNITED STATES PATENT OFFICE 2,160,939

POLYMERIZATION OF VINYLIDENE HALIDES

Robert C. Reinhardt, Midland, Mich., assignor to The Dow Chemical Company, Midland, Mich., a corporation of Michigan No Drawing. Application October 14, 1937, Serial No. 168,935

5 Claims. (Cl. 260—80)

This invention relates to an improved catalyst for the polymerization of vinylidene halides, i. e. vinylidene chloride, bromide, and chloro-bromide.

Catalysts which have been employed for the polymerization of vinylidene halides include benzoyl and other peroxides, and mixtures thereof with tetra-ethyl lead and various poly-halo oxygen-containing organic compounds, especially those selected from the group consisting of the poly-halo-phenols, poly-halo hydrocarbon-substituted phenols, chloro-acetyl chloride, and poly-halo-aryl ethers. It has been disclosed by Ralph M. Wiley, in a co-pending application Serial Number 146,418, filed June 4, 1937, that a catalyst mixture such as that described above, containing tetra-ethyl lead, a peroxide, and one of the poly-halo oxygen-containing organic compounds, can be made more effective, especially in low temperature polymerizations, by the addition thereto of metallic copper or a copper compound such as copper oxide, copper chloride, copper sulphide, copper sulphate, copper acetate, copper salicylate, etc.

I have now discovered that it is possible to increase the activity of copper to promote the action of such a catalyst mixture in the polymerization of vinylidene halides or in their co-polymerization with other polymerizable materials by electrolytically depositing it in a spongy form. Such copper may suitably be prepared by passing direct current, at a current density of about 300 to 600 amperes per square foot, between two copper electrodes immersed in a standard copper sulphate plating solution. Lower current density also provides a copper deposit in usable form but I have found that 300 to 600 amperes per square foot yields a spongy deposit of copper which is a very effective promoter when added to a catalyst for the polymerization of vinylidene halides.

Spongy copper which has been prepared in the method described above can be converted into catalytically active chemical derivatives thereof by subjecting its surface to the action of such agents as hydrogen sulphide, hydrogen chloride, or oxygen, the latter especially at a dull red heat, without, however, destroying the cellular or spongy nature of the copper on which the reaction products are supported. Copper oxide or copper salts made in the above manner by surface treatment of spongy copper also possess increased activity as catalyst promoters for the polymerization of vinylidene halides.

According to the invention, a vinylidene halide, with or without another polymerizable material, e. g. a vinyl ester, is treated with catalytic quantities of a mixture comprising benzoyl peroxide, tetra-ethyl lead, a poly-halo oxygen-containing organic compound of the class described above, and electrolytically deposited spongy copper or copper compound derived therefrom.

The following examples illustrate the beneficial results which are obtained through the employment of such improved catalytic mixture:

Example 1

In each of separate vessels was placed a mixture of 71 per cent vinylidene chloride, 25 per cent vinyl chloride, 0.5 per cent benzoyl peroxide, 0.5 per cent chloro-acetyl chloride, and 0.5 per cent tetra-ethyl lead. The total weight of this mixture was 32.5 grams. The individual containers were treated with 0.01 gram of active copper or copper compounds as shown in the following table, except one container which was used as a check, and were then subjected to a temperature of 30° C. for a period of 24 hours. The extent of polymerization after this period is noted in the table:

| Run No. | Catalyst addition agent | Percent polymerization |
|---|---|---|
| 1 | None | 4 |
| 2 | Spongy copper | 12 |
| 3 | Sheet copper | 5.5 |
| 4 | Cuprous chloride* | 8 |
| 5 | Copper sulphide* | 10 |
| 6 | Cupric oxide* | 8 |
| 7 | Cupric oxide, C. P. | 4.5 |

*These promoters were prepared by surface-treating freshly electro-deposited spongy copper without destroying the cellular or spongy form thereof.

Example 2

In order to make a comparison between the effectiveness of electrolytically deposited copper in spongy form and sheet copper, a series of 20 simultaneous runs were made, 8 in which from 0.1 to 0.5 per cent of spongy copper was added to the mixture, 8 in which a like amount of sheet copper was placed in the reaction vessel, and 4 in which no copper was added to the catalyst mixture. In each of these runs the mixture to be polymerized consisted of 19 cc. of vinylidene chloride and 8 cc. of vinyl chloride. This mixture weighed approximately 31 grams. To each of the bottles was added 0.12 gram benzoyl peroxide and 0.10 cc. each of tetra ethyl lead and chloro-acetyl chloride. Four of the samples containing spongy copper and four containing sheet copper were polymerized at 30° C. while an equal number of each type of sample was polymerized at 50° C. over similar periods of time as shown in the following table. As polymerization progressed, 2 samples from each group were removed at the end of 21 hours and the remaining samples were removed at the end of 53 hours. The products were analyzed to determine the weight of co-polymer in each case, the results of which are given in the following table:

| Run No. | Copper added | | Time, hours | Temperature, °C. | Percent polymerization |
|---|---|---|---|---|---|
| | Type | Percent | | | |
| 1 | None | | 21 | 30 | 5 |
| 2 | Spongy | 0.5 | 21 | 30 | 27 |
| 3 | Sheet | 0.5 | 21 | 30 | 23 |
| 4 | Spongy | 0.1 | 21 | 30 | 28 |
| 5 | Sheet | 0.1 | 21 | 30 | 8 |
| 6 | None | | 53 | 30 | 18.7 |
| 7 | Spongy | 0.5 | 53 | 30 | 42 |
| 8 | Sheet | 0.5 | 53 | 30 | 37 |
| 9 | Spongy | 0.1 | 53 | 30 | 58 |
| 10 | Sheet | 0.1 | 53 | 30 | 14 |
| 11 | None | | 21 | 50 | 31.5 |
| 12 | Spongy | 0.5 | 21 | 50 | 72 |
| 13 | Sheet | 0.5 | 21 | 50 | 56 |
| 14 | Spongy | 0.1 | 21 | 50 | 64 |
| 15 | Sheet | 0.1 | 21 | 50 | 24 |
| 16 | None | | 53 | 50 | 78 |
| 17 | Spongy | 0.5 | 53 | 50 | 76 |
| 18 | Sheet | 0.5 | 53 | 50 | 69 |
| 19 | Spongy | 0.1 | 53 | 50 | 90 |
| 20 | Sheet | 0.1 | 53 | 50 | 56 |

It appears from the foregoing table that when spongy copper is added to the catalyzed polymerization mixture in an amount equivalent to 0.5 per cent of the weight thereof, it is slightly more effective than a like amount of sheet copper at 30° C. while at 50° C. this amount of spongy copper is approximately 1¼ times as effective as a catalyst mixture to which has been added sheet copper. When, however, 0.1 per cent of spongy copper is employed, based on the weight of the polymerizable materials present, polymerization occurs from 3½ to 4½ times as rapidly as when sheet copper is employed at 30° C. and from 1½ to 3 times as rapidly at 50° C. With spongy copper, 0.1 per cent is as effective as 0.5 per cent in promoting catalysis. With sheet copper, 0.5 per cent is much more effective than 0.1 per cent, but neither are as effective as 0.1 per cent of spongy copper. It is desirable therefore to employ as a catalyst mixture for the polymerization of vinylidene halides, or for their co-polymerization with other polymerizable materials, a catalyst consisting of approximately equal parts of benzoyl peroxide, tetra-ethyl lead, chloroacetyl chloride or its equivalent, and an amount of electrolytically deposited spongy copper equivalent to about 0.1 per cent of the weight of polymerizable material.

Example 3

To a mixture of 28 pounds of vinylidene chloride, 20 pounds of vinyl chloride, and 1 pound of phenoxy-propylene oxide was added 4 ounces each of benzoyl peroxide and chloro-acetyl chloride, 6 ounces of lead tetra-ethyl, and 5.5 grams of spongy electrolytic copper. This mixture was heated to 30° C. for 12 hours after which time there was isolated 8 pounds and 12 ounces of a solid co-polymeric product. A similar mixture to which was added 1 ounce of copper sheet in place of the spongy copper employed in the foregoing experiment yielded only 7 pounds and 12 ounces of a solid co-polymer after 24 hours at 30° C. In these two runs it is shown that 1 part of spongy copper caused the production of more co-polymeric material in one-half the time than was formed by a catalyst comprising 5 times as much strip copper.

The invention has been illustrated with reference to the polymerization of vinylidene chloride and its mixtures with vinyl chloride. It is equally applicable to the polymerization of other vinylidene halides such as vinylidene bromide or chloro-bromide and to mixtures of the vinylidene halides with other polymerizable materials such as vinyl acetate, styrene, acrylic acid esters, alkyl substituted acrylic acid esters, divinyl ether, etc. As shown in the table of Example 1, the catalyst to be employed need not comprise metallic copper in spongy form but may contain a spongy derivative thereof such as copper oxide, copper sulphide, cuprous chloride, etc., which are prepared by reaction of oxygen, hydrogen sulphide, and hydrogen chloride, respectively, on electrolytically deposited copper without destroying its cellular or spongy nature. The amount of active copper or its derivatives which has been found most satisfactory in the new catalyst mixture, is from 0.05 to 0.5 per cent of the weight of polymerizable material.

Other modes of applying the principle of my invention may be employed instead of those explained, change being made as regards the materials herein disclosed, provided the step or steps stated by any of the following claims or the equivalent of such stated step or steps be employed.

I therefore particularly point out and distinctly claim as my invention:

1. A catalyst mixture, for the polymerization of a vinylidene halide, which comprises tetra-ethyl lead, a peroxide, a poly-halo oxygen-containing organic compound selected from the group consisting of poly-halo phenols, poly-halo hydrocarbon-substituted phenols, chloro-acetyl chloride, and poly-halo aryl ethers and a material selected from the group consisting of electrolytically deposited spongy copper and spongy derivatives thereof prepared by chemical reaction upon its surface with a reagent selected from the group consisting of hydrogen chloride, hydrogen sulphide, and oxygen, without destroying its spongy structure.

2. A catalyst mixture, for the polymerization of a vinylidene halide, which comprises tetra-ethyl lead, benzoyl peroxide, chloro-acetyl chloride, and a material selected from the group consisting of electrolytically deposited spongy copper and spongy derivatives thereof prepared by chemical reaction upon its surface with a reagent selected from the group consisting of hydrogen chloride, hydrogen sulphide, and oxygen, without destroying its spongy structure.

3. A catalyst mixture, for the co-polymerization of vinylidene chloride and a compound co-polymerizable therewith, which comprises tetra-ethyl lead, benzoyl peroxide, chloro-acetyl chloride, and electrolytically deposited spongy copper.

4. A process for the polymerization of a vinylidene halide which comprises adding thereto a catalyst mixture comprising tetra-ethyl lead, a peroxide, a poly-halo oxygen-containing organic compound selected from the group consisting of poly-halo phenols, poly-halo hydrocarbon-substituted phenols, chloro-acetyl chloride, and poly-halo aryl ethers, and a material selected from the group consisting of electrolytically deposited spongy copper and spongy derivatives thereof prepared by chemical reaction upon its surface with a reagent selected from the group consisting of hydrogen chloride, hydrogen sulphide, and oxygen, without destroying its spongy structure, and heating the mixture to a temperature between about 30° C. and about 50° C. until the desired degree of polymerization occurs.

5. In a process for the co-polymerization of vinylidene chloride and a compound co-polymerizable therewith, the step which consists in heating the same up to about 50° C. in the presence of tetra-ethyl lead, benzoyl peroxide, chloro-acetyl chloride, and about 0.05 to about 0.5 per cent by weight of electrolytically deposited spongy copper based on the weight of the co-polymerizable materials present.

ROBERT C. REINHARDT.